Figure 1:
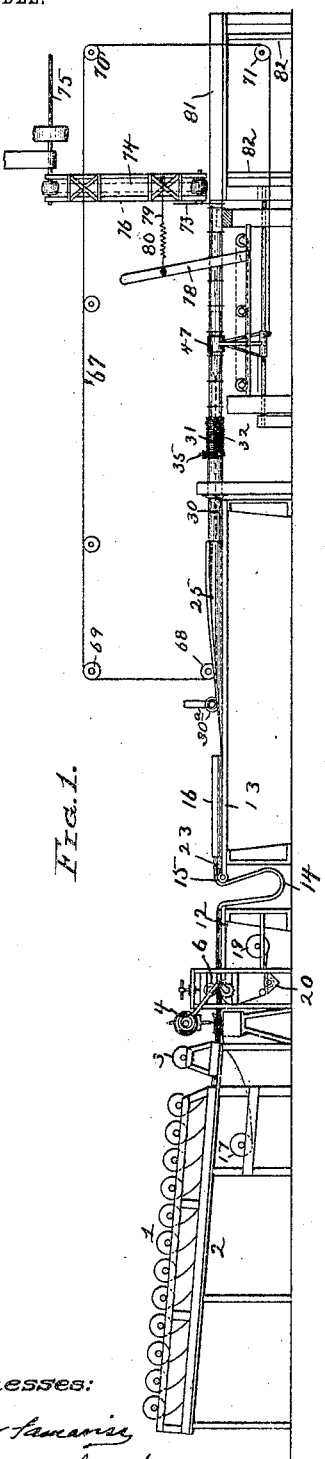

No. 775,538. PATENTED NOV. 22, 1904.
J. A. McCONNELL.
APPARATUS FOR MAKING NON-CONDUCTING COVERINGS.
APPLICATION FILED FEB. 13, 1902.
NO MODEL. 7 SHEETS—SHEET 1.

Witnesses: Inventor:
John A. McConnell
By Kay & Totten
Attorneys.

No. 775,538. PATENTED NOV. 22, 1904.
J. A. McCONNELL.
APPARATUS FOR MAKING NON-CONDUCTING COVERINGS.
APPLICATION FILED FEB. 13, 1902.
NO MODEL. 7 SHEETS—SHEET 2.
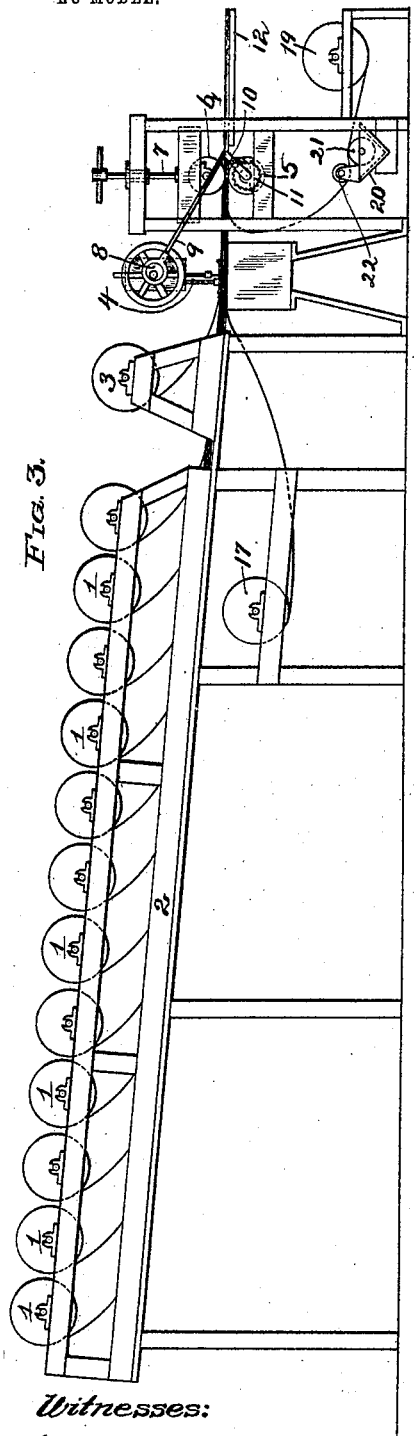
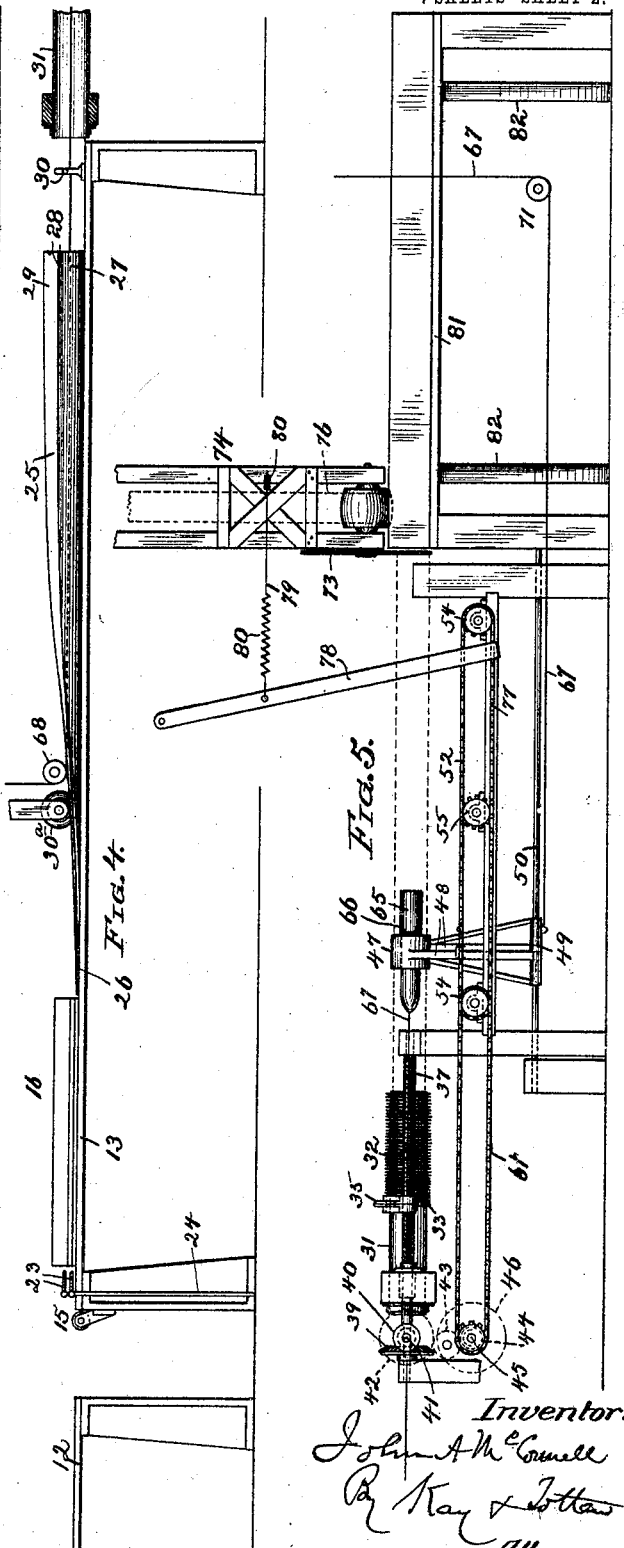
Witnesses:
Inventor:

No. 775,538. PATENTED NOV. 22, 1904.
J. A. McCONNELL.
APPARATUS FOR MAKING NON-CONDUCTING COVERINGS.
APPLICATION FILED FEB 13, 1902.
NO MODEL. 7 SHEETS—SHEET 3.
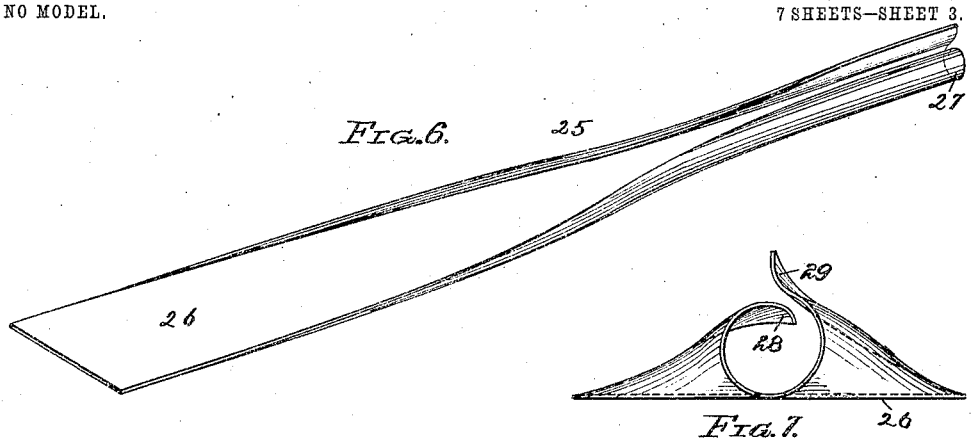
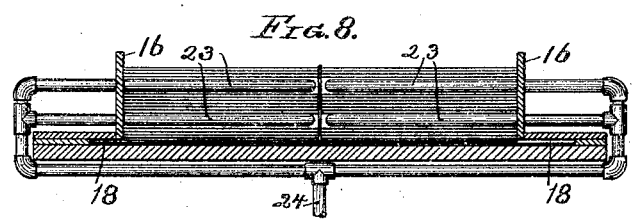
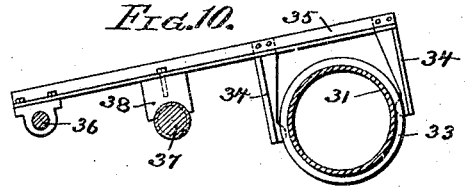
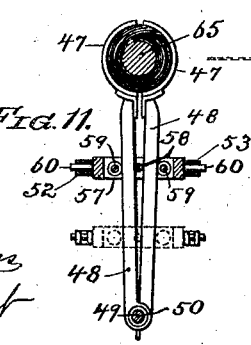
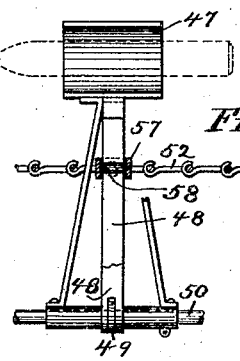
Witnesses:
Walter Tamarin
Fred D. Sweet
Inventor:
John A. McConnell
By Kay & Totten
Attorneys.

No. 775,538. PATENTED NOV. 22, 1904.
J. A. McCONNELL.
APPARATUS FOR MAKING NON-CONDUCTING COVERINGS.
APPLICATION FILED FEB 13, 1902.
NO MODEL. 7 SHEETS—SHEET 4.
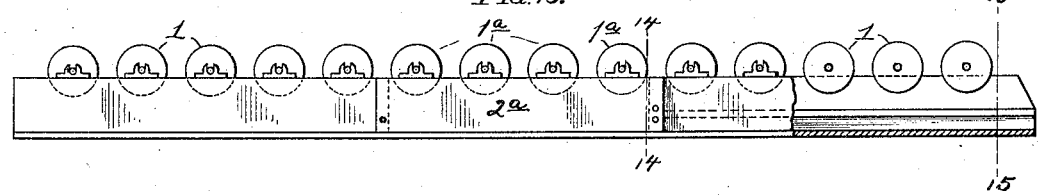
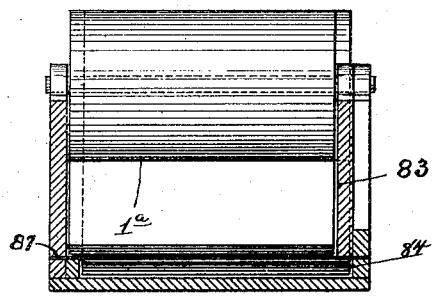
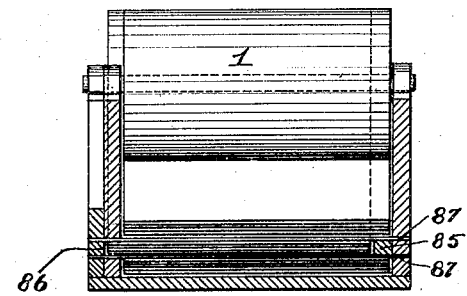
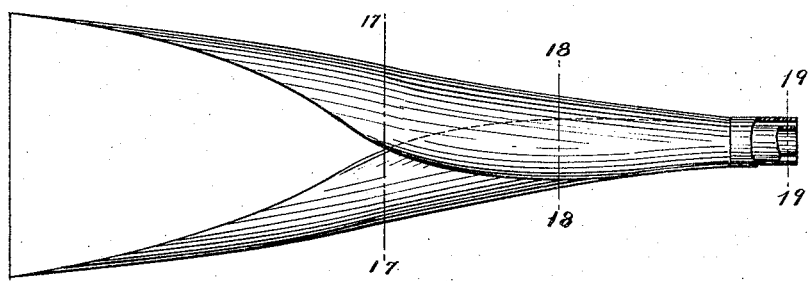
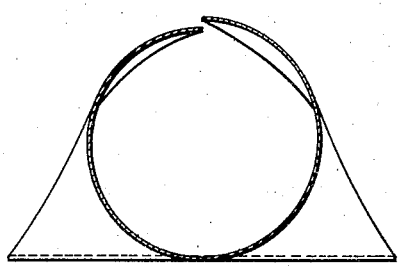
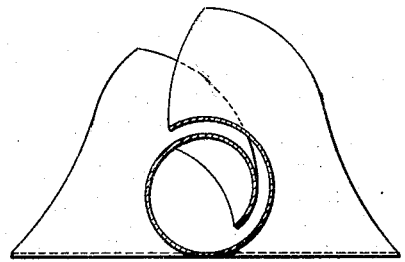

No. 775,538. PATENTED NOV. 22, 1904.
J. A. McCONNELL.
APPARATUS FOR MAKING NON-CONDUCTING COVERINGS.
APPLICATION FILED FEB 13, 1902.
NO MODEL. 7 SHEETS—SHEET 6.
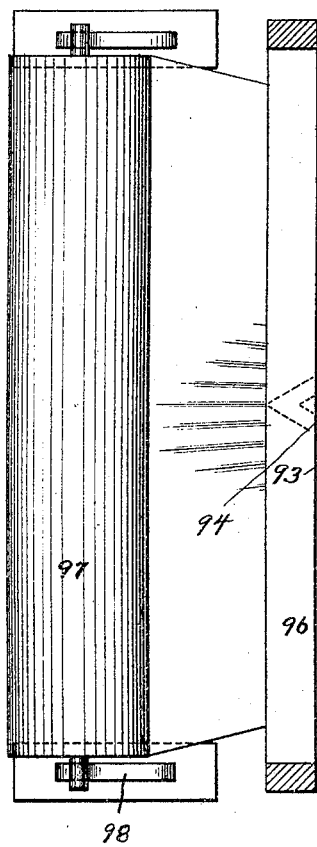
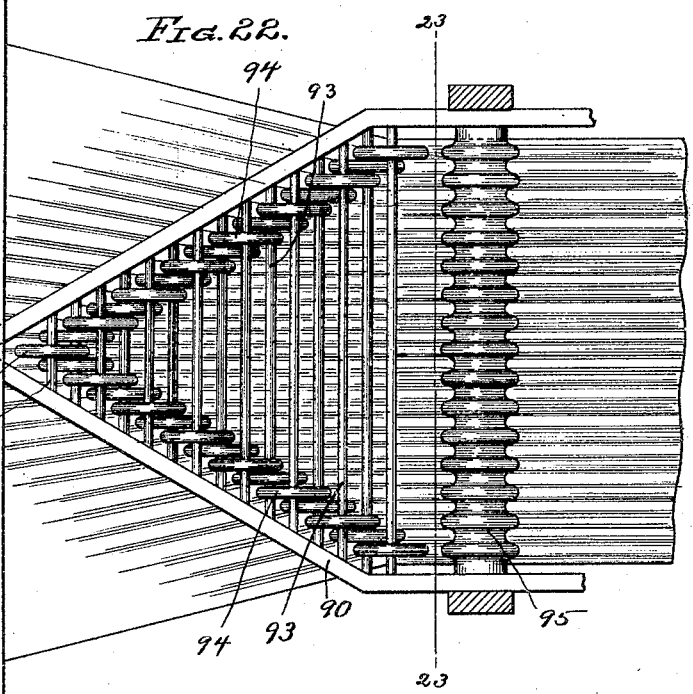
Fig. 22.
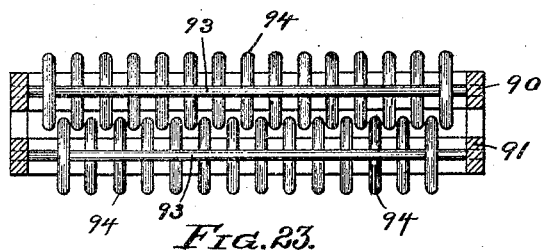
Fig. 23.
Witnesses:
Inventor:
John A. McConnell
By Kay & Totten
Attorneys.

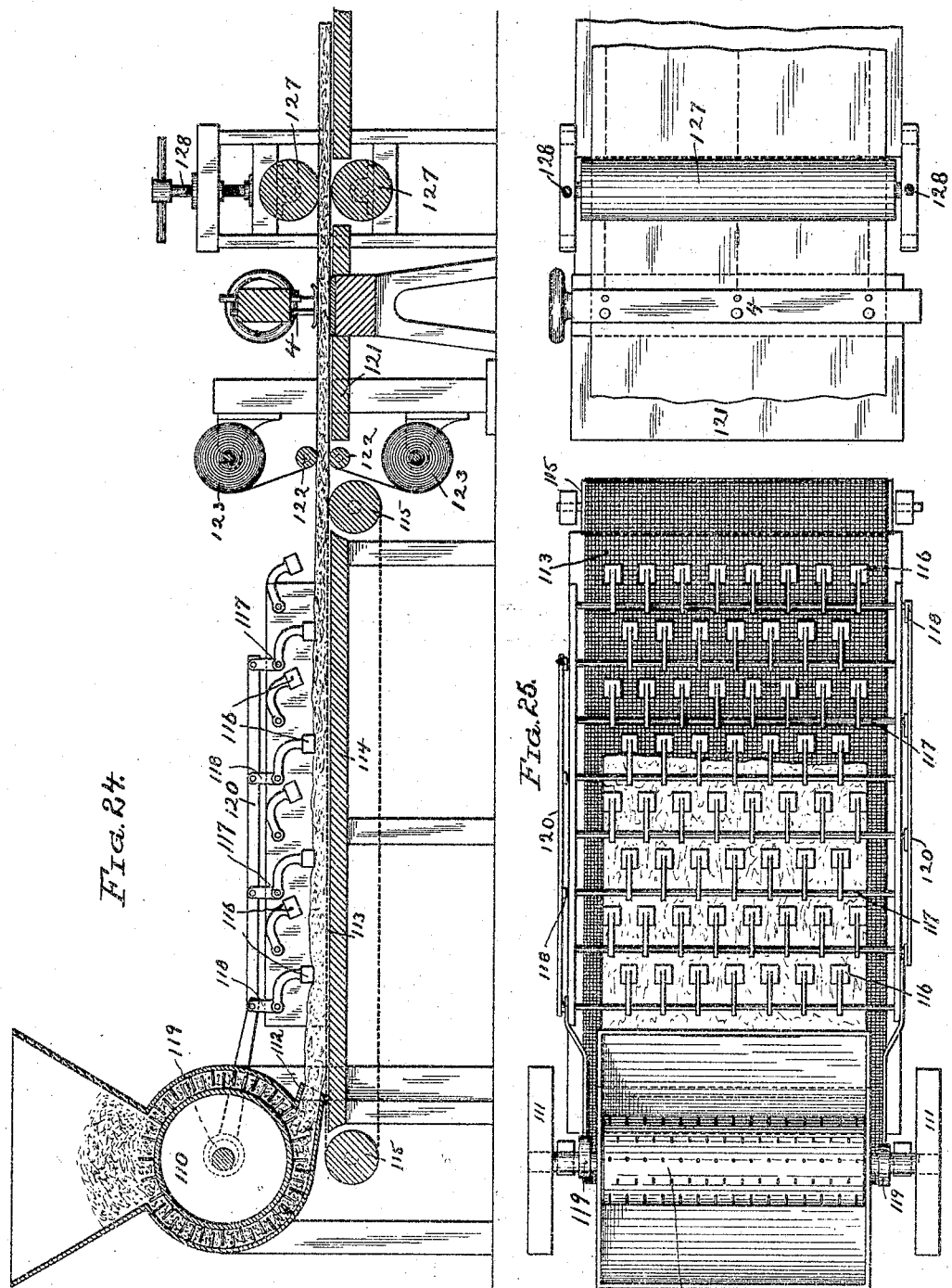

No. 775,538. Patented November 22, 1904.

UNITED STATES PATENT OFFICE.

JOHN A. McCONNELL, OF ALLEGHENY, PENNSYLVANIA, ASSIGNOR TO McCONNELL ASBESTOS & COVERING CO., OF PITTSBURG, PENNSYLVANIA, A CORPORATION OF PENNSYLVANIA.

APPARATUS FOR MAKING NON-CONDUCTING COVERINGS.

SPECIFICATION forming part of Letters Patent No. 775,538, dated November 22, 1904.

Application filed February 13, 1902. Serial No. 93,933. (No model.)

*To all whom it may concern:*

Be it known that I, JOHN A. McCONNELL, a resident of Allegheny, in the county of Allegheny and State of Pennsylvania, have invented a new and useful Improvement in Apparatus for Making Non-Conducting Coverings; and I do hereby declare the following to be a full, clear, and exact description thereof.

My invention relates to apparatus for making non-heat-conducting coverings for steam-pipes, refrigerator-pipes, boilers, and the like, which are constructed of several independent layers of paper, felt, asbestos, or other suitable non-heat-conducting material.

In the manufacture of tubular non-heat-conducting coverings of this character it has been the custom to wrap the paper, felt, or other fibrous sheets around a mandrel until the desired thickness is built up. It was then removed from the mandrel and cut open longitudinally to permit its being placed upon the pipe or other body upon which it is to be used. In wrapping the layers around the mandrel they were cemented together so that the finished tube was very stiff, so that it was difficult to open up the same to place it about the pipe or other body. Hence it has been the custom to cut the tubular covering into halves longitudinally, thus making two longitudinal joints which ran directly from the exterior to the interior of the covering, thereby forming two short and straight passages for the escape of heat or the admission of cold and also destroying the natural elasticity or recoil of the material and making the coverings entirely dependent upon external bindings to hold them in place around the pipe. It has been the custom to make such coverings in sections about three feet long, and it will be apparent that stopping and starting the various wrapping operations upon the mandrel and removing the mandrel to take off each section of tubular covering and then cutting the section open is a slow process, so that with the most improved machines heretofore in use it has not been possible for two persons operating such a machine to make more than one thousand feet per day of covering for small-sized pipes and a very much less quantity for larger sizes.

It is the object of my invention to provide apparatus for making tubular coverings of this kind whereby the same is formed progressively or at quick intervals from strips of paper, so that almost an unlimited quantity of covering can be made in a day, and whereby such covering can be provided with a longitudinal joint which is either overlapping or interlocking, tongued and grooved, U, V, or L shaped, or circuitous, so that an out-of-line joint is provided which prevents the escape of heat from the pipe or other body covered thereby.

A further object of my invention is to provide apparatus for making tubular coverings having only a single longitudinal joint, so that the natural elasticity or recoil of the materials is retained, which may be further increased by moistening the same during process of manufacture and then holding the tube in shape until dry.

A further object of my invention is to provide apparatus for making coverings of this kind having the layers united in such a manner that they will move upon each other, so that the tubular sections will open up easily when placing them about the pipe and without the necessity of cutting them into halves.

To these ends my invention consists, generally stated, in providing means whereby strips or layers of paper, felt, asbestos, or other fibrous sheets or any suitable material whatever are laid one upon the other until the desired thickness of covering is obtained and then bent progressively into a tube or other suitable shape having a longitudinal joint.

My invention also consists in providing means for suitably securing the said strips or layers of fibrous material together, in combination with means for holding the edges of the respective sheets on desired line while being drawn through the machine, means for drawing them through forming-bells or other devices, whereby they are bent into tubular form, the diameter of the covering-tube being gaged outside by the size of the forming bell or tube instead of by an internal mandrel, as heretofore, and means for cutting the formed tube into sections of suitable length.

The invention further consists in providing means for dampening one or more of the strips during the process of manufacture, which dampness is afterward communicated to the other strips, and providing means which after the strips are bent into tubular form hold the same in such shape until dry, thereby imparting a permanent set thereto and which bindings also serve to hold the coverings permanently on the pipes.

In short, my invention consists of apparatus whereby such tubular covering can be formed progressively and practically continuously from strips or layers of fibrous material, thereby greatly increasing the output and providing a pipe-covering having a single longitudinal joint.

To enable others to construct and use my apparatus, I will describe the same more fully, referring to the accompanying drawings, in which—

Figure 2:
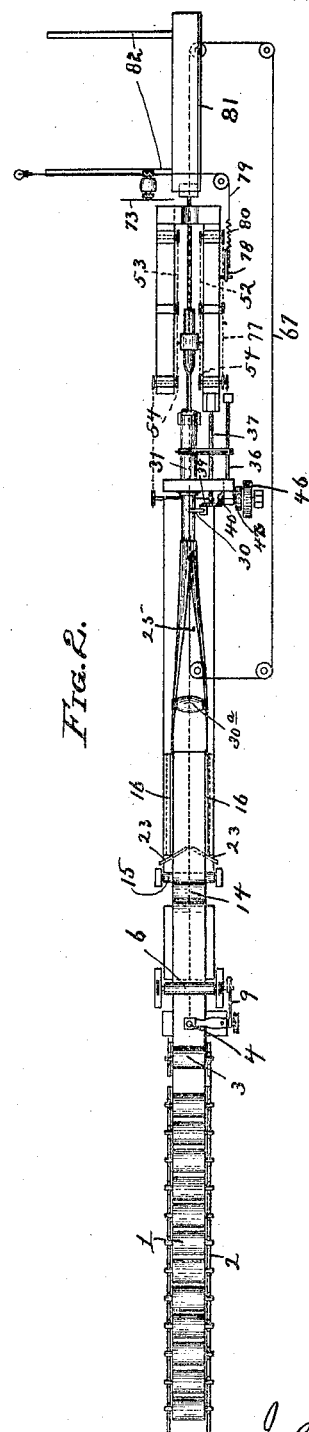
Figure 20:
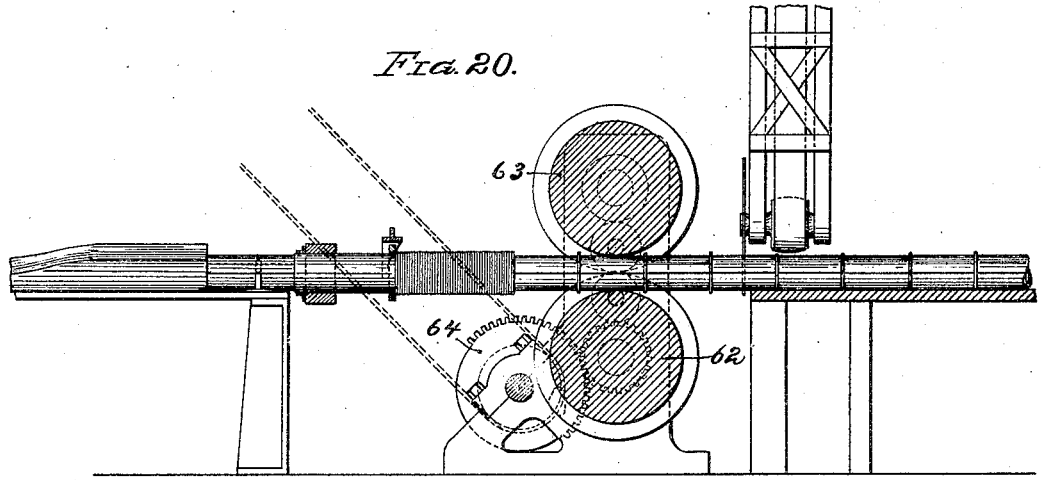
Figure 21:
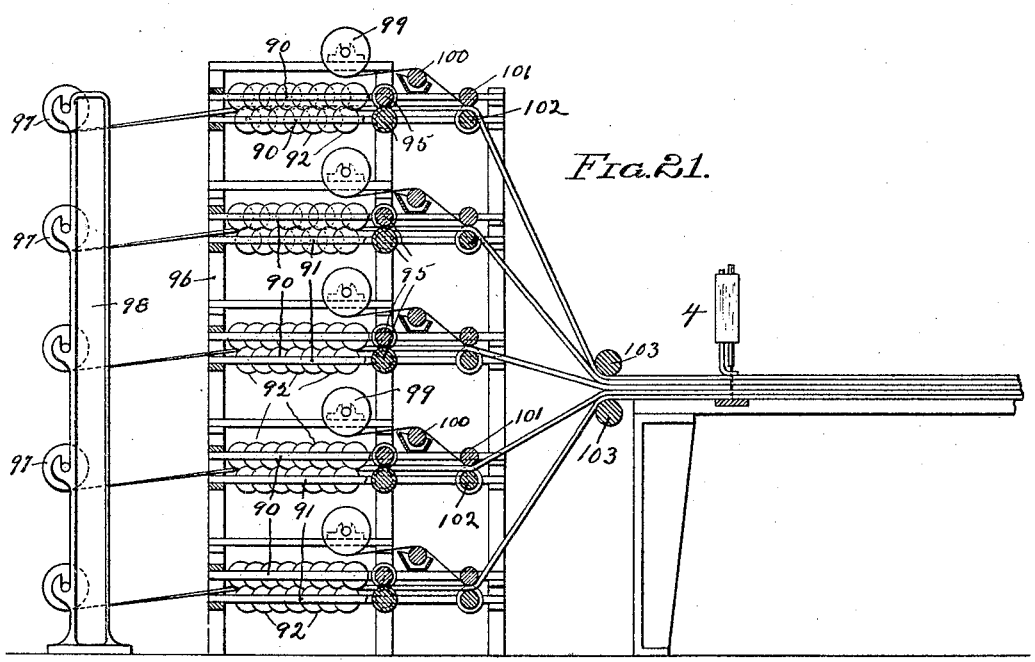

Figure 1 is a side view of the apparatus, partly in section. Fig. 2 is a plan view of the same, partly in section. Fig. 3 is a side view of the front end of the apparatus. Fig. 4 is a similar view of the central portion thereof, partly in section. Fig. 5 is a similar view of the rear end thereof. Fig. 6 is a perspective view of the forming bell or funnel. Fig. 7 is a rear end view of the same. Fig. 8 is a cross-section through the apparatus, disclosing the means for dampening the strips. Fig. 9 is an enlarged sectional detail of one of the dampening-pipes. Fig. 10 is a sectional detail of the ring or band applying means. Fig. 11 is an end view, partly in section, of the drawing clamp or tongs. Fig. 12 is a side view, partly in section, of the same. Fig. 13 is a side view, partly in section, of a modified form of stand or trough for holding the strips of material. Figs. 14 and 15 are cross-sections on the lines 14 14 and 15 15, respectively, Fig. 13. Fig. 16 is a plan view of a modified forming-bell. Figs. 17, 18, and 19 are cross-sections of the same on the lines 17 17, 18 18, and 19 19, respectively. Fig. 20 is a longitudinal section showing drawing-rolls. Fig. 21 is a longitudinal section of the corrugating mechanism. Fig. 22 is a plan view of the same. Fig. 23 is a cross-section on the line 23 23, Fig. 22. Fig. 24 is a longitudinal section of a modification for supplying loose fibrous material, and Fig. 25 is a plan view of the same.

The strips of paper or other fibrous material from which the covering is to be made are supported in any desired way so that the said strips can be laid one upon the other; but I prefer to wind said strips upon spools or rollers 1 1 and support the latter in the stand or trough 2, one behind the other and in a slightly-inclined position, so that the strips of material coming from said rolls will be laid one upon the other and guided in their proper course by the sides and bottoms of the trough. In the drawings I have shown the spools 1 all of the same width and the strips of paper or other material coming from the same also of the same width; but it will be obvious that the strips may be made of different widths and laid out of line with each other, if desired, to form covering such as described in my application filed August 4, 1900, Serial No. 25,907, or they may be laid with each layer narrower than the preceeding one to cause the edges of all to come into line when the tube is formed and form a straight joint. It is also obvious that these strips may, if desired, be plain or corrugated either transversely or longitudinally, as described in my application aforesaid. If it is desired to give the covering a lining of asbestos or other soft material, a strip of such material will be supported on a spool 3 in front of the trough 2 or in the front end thereof. After the desired number of strips have been laid one upon the other they are secured together in any suitable manner—as, for instance, by being stitched together along their longitudinal centers, as shown, by means of any suitable stitching or sewing mechanism 4. In lieu of stitching the same together the said strips may be united by stapling or even by pasting. From the stitching mechanism 4 the strips pass between two plain-faced feed-rollers 5 6, the latter being adjustable up and down, as by means of the screws 7, in order to firmly bite the assembled strips. These feed-rollers may be driven in any approved manner; but I prefer to drive them from the stitching mechanism, so as to operate in unison therewith and serve as a feed therefor. This is conveniently accomplished by providing the shaft of the stitching mechanism with an eccentric 8, on which is a strap which is connected by the rod 9 to the outer end of a ratchet-lever 10, the inner end of which is mounted on the journal of the roller 5. The latter is provided with a ratchet face or wheel 11, which is engaged by the pawl on the lever 10. By these means the roller 5 is given a step-by-step rotary movement, as will be readily understood, thereby progressively drawing or feeding the strips through the stitching mechanism. From the feed-rollers 5 and 6 the united strips pass onto the table 12 and thence to the tube-forming bell. Inasmuch as in the preferred form of my apparatus the subsequent forward movement of the assembled strips is intermittent, as will hereinafter appear, and it is desirable to operate the stitching mechanism continuously, I provide means whereby the united strips may form a loop after leaving the feeding-rollers 5 6. This is conveniently accomplished by leaving a gap between the table 12 and the end of the table 13, upon which the forming-bell is located, the loop 14 of material bending down into this gap. To prevent kinking of the layers when bending into this loop, I make the table 12 three or four feet long, so as to support the material after it leaves the feed-rollers. The end of the table 13 is provided with a roller 15, so that the material can pass up onto said table with the least friction. This table is also provided on one or both sides with a gage or guide 16, which engages the edges of the combined strips and guides them to the forming-bell.

It is generally desirable to make the outside of a tubular cover considerably wider than the others, so as to form a flap to cover the joint and aid in fastening the covering to the pipe. The lowermost layer will therefore preferably be wider than the others, and as the trough 2 is preferably about the width of the other strips, so as to aline the same, the spool or roller for the lowermost strip will be supported below the trough 2, as at 17, and said strip will be led directly from said spool to the table of the stitching mechanism 4. To permit this wider outer layer to pass to the forming-bell, I provide the gages 16 or at least one of them with a crevice or groove 18, through which the projecting edge of the outer layer will pass. Preferably said layer will project at both edges, but a greater distance at one side than on the other, as shown in Fig. 8. It is also generally desirable to form the outside sheathing of some tough strong material, such as canvas, and cement the same upon the outer surface of the tubular covering outside of the stitching which holds the other layers together. To apply such sheathing, I provide a spool or mandrel 19 in close proximity to the feed-rolls 5 and 6, preferably placing this spool under the table 12. Between this spool and the feed-rollers 5 and 6 I place a paste-trough 20, in which a paste-roller 21 is arranged to revolve, and guide-rollers 22 are arranged on one or both sides of the trough.

The sheathing material is wound on the spool 19, and the latter is then placed in position, as shown. The sheathing is drawn from the spool and caused to press tightly upon the upper surface of the paste-roller 21. The resulting friction revolves the paste-roller, or it may be power-driven, and a film of glutinous material is carried by the surface of the roller and spread upon the under surface of the canvas or other sheathing. The sheathing then changes its direction and passes to the feed-rollers, thus turning over and bringing the glutinous coated surface uppermost into contact with the outer layer of the united strips. Passing through the feed-rollers in that position the glutinous coated sheathing is pressed against the outer surface of the combined strips and caused to adhere to the same. If desired, the sheathing and outer layer of the covering-tube may be first cemented together by a separate operation, then wound upon the described spool, and united to the outside of the combined strips either before or after passing the stitching-machine.

When it is desired to moisten one or more of the strips, so as to give a set to the finished tubular article, such moistening can be conveniently accomplished as soon as the strips pass onto the table 13. As a suitable means for this I provide the spray-pipes 23, extending inwardly at an angle, as shown, toward the center of the table and projecting between the layers. These pipes are provided with perforations whereby moisture can be communicated to the strips, and they are connected to any suitable water-supply pipe 24. One or more pairs of these pipes can be used as desired or necessary, two pairs being shown in Fig. 8. In lieu of these pipes I may moisten one or more strips by drawing the same through a trough of water before it reaches the stitching-machine or otherwise saturate it. After being dampened the combined strips are given the desired form, and usually they will be coiled into tubular form. To accomplish this rapidly and progressively, I draw said combined strips through a suitable forming ring or bell. This may vary greatly in shape and length from a simple ring to a convoluted funnel. A bell suitable for this purpose is shown at 25 in Figs. 6 and 7, and it starts as a flat plate 26 and passes gradually into circular form at 27, with one edge 28 below or inside the other edge 29, so as to cause the edges of the tubular covering to overlap. A hook 30 is also put at the mouth of the bell for pressing one edge down so the other will overlap. In case a butt-joint is desired the two edges of the bell will be at the same height, or, in other words, the delivery end of said bell will be practically a circle. If it is desired to form tubular coverings having more than a single convolution or winding, the bell will be given corresponding convolutions toward its delivery end. Such a bell is shown in Figs. 16, 17, 18, and 19, and it has one of its edges rolled in under the other, so that at its delivery end two full convolutions are formed, as seen in Fig. 19. To hold the layers down in the bell, so that they will coil smoothly, I provide a roller 30$^a$, which is suitably mounted, so as to run on the material as it begins to form in the bell. The combined strips are drawn through the bell by mechanism hereinafter described and are progressively and rapidly bent into tubular form.

After the combined strips are bent into tubular form it is desirable to hold them in that form until the dampness has permeated throughout the layers and the tube has again dried, so that a permanent set will be given thereto. It is therefore necessary to apply some form of tape, band, or ring to the tubular covering. These bands or rings can be applied by hand; but I prefer to apply them by suitable mechanism. For this purpose I place at the rear end of the bell or funnel 25 a tube 31, through which the tubular covering is drawn and upon which tube are supported a number of rings or bands 32, which are fed gradually one by one off the rear end of said tube onto the tubular covering as it emerges therefrom. As a convenient means for feeding said bands or rings off the tube 31 I surround the latter with a ring or annular follower 33, which is engaged by arms 34 on a frame 35. The latter is guided on the rod 36 and is fed along gradually by means of a screw 37, engaging a threaded block 38, secured to the frame 35. In lieu of the screw 37 and frame 35 I may employ any other suitable means for gradually shoving the rings or bands off the tube 31 and onto the tubular covering as it emerges from said tube.

The screw 37 may be driven by any suitable mechanism, such as the bevel-gear 39, engaged by a similar pinion 40 on a countershaft 41. The latter is provided with the spur-gear 42, which is connected by the intermediate idler 43 with a spur-gear 44 on the main drive-shaft 45. The latter is provided with a pulley 46 or other suitable means for receiving the power. When I desire the screw to act intermittently, I substitute a mutilated gear for the gear 44 on the main driveshaft.

In order to progressively bend the combined strips into tubular form, it is necessary that they be drawn through the forming bell or funnel. Various forms of mechanism for this purpose may be employed, and in Figs. 1, 2, 5, 11, and 12 I have illustrated mechanism whereby the tubular covering is intermittently drawn forward. This mechanism comprises a pair of grasping-tongs 47, the ends of which are semicylindrical, as shown, in order to get a firm hold on the tubular covering. These tongs have suitable levers 48 pivoted together at 49 and traveling on the guide-rod 50. The tongs are adapted to be drawn forward, then released from the tube, returned to the starting position, again caused to grasp the tube, and again drawn forward, and so on continuously. As a convenient means for accomplishing these movements I have provided a sprocket-chain, and preferably two such chains, 52 and 53, one on each side of the tongs, so that the latter can be evenly moved without danger of canting or binding. These sprocket-chains pass around suitable sprocket-wheels 54 at their ends, and in order to keep them from sagging guiding sprocket-wheels 55 are located approximately midway of the length thereof. The arms or levers 48 of the tongs are engaged by a suitable frame 57, which is provided with a transverse pin 58, lying between the arms of the tongs, and with suitable rollers 59, lying outside of each of said arms. This frame is provided on its two opposite sides with studs or pintles 60, which are secured to or suitably engaged with the sprocket-chains 52 and 53. The frame 57 is carried along by the sprocket-chains, and when it passes over the rear sprocket-wheels 54 it is carried downward from the full-line position shown in Fig. 11 to the dotted-line position shown therein. The effect of this is to carry the pin 58 down between the arms 48 of the tongs and separate them, thereby causing the said tongs to open and release the tubular covering. The further travel of the frame with the sprocket-chains carries the tongs back to the forward end of said chains, and as the frame passes up around the forward sprocket-wheels the rollers 59 ride up the outer face of the levers 48, thereby closing the tongs and causing the same to grasp the tubular covering so that in the further movement of the chain the tubular covering is drawn forward through the forming bell or funnel. By this means the tubular covering is drawn in an intermittent course through the forming devices.

The sprocket-chains 52 and 53 may be driven in any convenient way, and I have shown them driven, by means of a sprocket-chain 61, from the main drive-shaft 45. The sprocket-chains 52 and 53 are located on opposite sides of the machine, and each is driven from its own side, as shown, so as not to interfere with the travel of the tongs.

Instead of the traveling tongs just described I may for drawing material through the forming-bell employ rolls 62 and 63, in the contact-surfaces of which I form grooves of the diameter which I desire to give the outside of the covering, as shown in Fig. 20. These rolls may be driven in any desired way, as by the gear 64, driven by a belt or other power. When I desire these rolls to stop periodically to allow the tube to stand still while being sawed, I mutilate the gear 64, as shown.

To prevent the fibrous tube from crushing where grasped by the tongs, I provide a traveling mandrel 65 about a foot long and of proper size at its greatest diameter to fit the inside of the tube that is being formed. This mandrel I make somewhat pointed at its rear end, as shown, so that when being drawn back inside the tube it will not catch on the inner surface thereof. To prevent the tongs from slipping in the tube, I may form a shoulder on this mandrel, as shown at 66, so placed that the tongs will grapple around the smaller part of the mandrel, and thus compress the material of the tube somewhat behind this shoulder and prevent slipping. I may accomplish the same result by making corrugations around the part of the mandrel that is to be grasped and making annular corrugations on the inside surface of the grasping jaws of the tongs, so that the ribs will press the material into the depressions of the mandrel, and vice versa. The larger diameter portion of the mandrel as it is drawn through the tube smooths out any roughness that may be thus caused by the tongs. For this reason the portion of the mandrel having the largest diameter is made smooth. It is necessary to have this mandrel travel forward the length of a section and then back in unison with the tongs, so as to be in a position to be grasped by the tongs. To accomplish this, I provide a cord or chain 67 and attach one end of same to the rear end of the mandrel, then pass the same through the tube that is being formed to a pulley located at a point, as at 68, where multiple sheets have not yet assumed sufficient tubular form to prevent the cord passing within the same. The cord or chain then rises a few feet, so as to be overhead, and then passes over the pulley 69 and back over other guide-pulleys preferably beyond the saw, which cuts off the sections. It here passes over a pulley 70 and back down to a point approximating a level with the pivot of the tong arms or levers, where it passes around a pulley 71 and back to the tongs and is attached to them, as shown. The mandrel is positioned inside the tube at the point where the tongs will grasp around both tube and mandrel. The tongs will carry the mandrel forward along with the tube six feet or whatever distance the tongs are caused to travel. Then when the grasp of the tongs is released and said tongs travel back they will through the chain 67 pull the mandrel through the tube an equal distance, so that it is always in position to be grasped by the tongs.

By the mechanism as far as described the strips of paper are formed into a tube by drawing the same through the bell or funnel 25 and through the tube 31, and as it emerges from said tube the bands or rings 32 are applied thereto. The continuous tubular covering is then cut into sections of suitable lengths—say six feet—by any convenient means. For this purpose I have shown a saw 73, which is mounted in the lower end of a swinging frame 74, pivoted to the driving-shaft 75 and driven by a suitable belt 76, connecting pulleys on the driving-shaft 75 and saw-arbor, as will be readily understood. This saw will be swung across the course of the tubular covering at the proper time and sever the same into lengths. When I desire to cut the tube into many short sections, I employ a gang of saws. It is desirable that the saw be swung to sever the tube by mechanical means and at just the proper time in the operation of the machine. There are many ways in which the saw may be given this alternate back-and-forth motion, and as a convenient and preferred means for doing this I have provided a sprocket-chain 77, which is similar to the sproket-chain 52 and mounted on sprocket-wheels on the same shafts with the sprocket-wheels 54. To this sprocket-chain 77 is attached the lower end of a lever 78, which is pivoted at its upper end to the ceiling or other support. To the lever is secured one end of a rope 79 or the like which passes around the guide-pulley 80, suitably supported, and has its other end attached to the swinging saw-frame 74. The rope is attached to the lever 78 at such a point and is of such a length that it will not bring the saw into contact with the tubular covering until after the latter has been released by the tongs and will then draw the saw across the course of said covering. A weight or spring attached to the opposite side of the saw-frame swings the saw back out of the course of such covering before the tongs again grasp the same. To prevent shock when the saw strikes the tube and to yieldingly draw the same through, a spring $80^a$ or other flexible member is placed in the cord 79.

Until sawed the tube-sections are supported on the inclined table 81, from which they roll away of their own accord on any suitable supports, preferably down inclined skids or rails 82.

When forming coverings provided with a tongue-and-groove joint, I use the form of spool support or trough shown in Figs. 13, 14, and 15. This trough $2^a$ is so constructed that the spools at or near the middle thereof are out of line with those at either end. As shown in Fig. 13, the four middle spools $1^a$ are set or jogged to one side with reference to the spools 1 at either end. This will be evident from an inspection of Figs. 14 and 15. In the former the middle spools $1^a$ are shown in front and slightly to the left of those at the farther end of the trough, and a board 83 is placed inside of the trough on the right-hand side thereof, while in Fig. 15 the spools 1 at the forward end of the trough are shown in front of and slightly to the right of those at the middle portion thereof, and the board 83 is on the left-hand side of the trough. At its middle portion the trough is provided with a groove 84 near the bottom on the right-hand side, while at its forward end the said trough is provided on the right-hand side with a projecting tongue 85 and on the left-hand side with a groove 86, both slightly above the bottom. The layers or strips from the rear set of spools are guided to the bottom of the trough with one edge in the groove 84. Those from the spools at the forward end of the trough are laid on the top and above the tongue 85 and groove 86, while those from the spools at the middle of the trough are guided in between these two and out of line with the same, with one edge in the groove 86 and the other against the tongue 85. In this way the strips are laid together so as to form a tongue on one edge and a groove on the other, and in this position they are led to the stitching mechanism and there secured together. The subsequent operation is the same as that above described. Cross-rods 87 are preferably stretched across the trough to guide the sets of strips and to separate the central layers from those above and those below the same.

When it is desired to form coverings from paper having longitudinal corrugations or flutings, it will be necessary to change the form of support for the rolls or spools and to provide fluting or corrugating apparatus. Figs. 21, 22, and 23 show apparatus for forming such coverings, and I believe that the same discloses novel fluting or corrugating mechanism. The fluting is done by two sets of rollers, one above the other and slightly interlocking. These sets of rollers begin as a single roller and gradually widen, as shown in Fig. 22, so as to begin the grooving or corrugating at the center of the sheet and gradually and progressively narrow the same, drawing it in from both sides. These two sets of rolls are mounted in suitable frames 90 and 91, which are of a general triangular form, as shown, and placed one above the other. The fluting-rollers are shown at 92 and are mounted on transverse shafts 93. The shafts in the two frames are not set directly above each other; but each one is slightly behind the corresponding shaft in the other frame. The first or foremost of these shafts is provided with a single fluting-roller 94, and each of the succeeding shafts is provided with two fluting-rollers, and the distance between said rollers gradually increases, so that said rollers will successively grip the sheet farther away from its center. The rollers are of such a size and the frames in which they are mounted are set such a distance apart that said rollers will interlock, as shown in Fig. 23. The first or foremost roller 94 will grip the sheet along its center while the next two rollers are in the lower frame and slightly to the rear of as well as at the sides of this central roller, so that they will bend the paper up at each side of the central roller 94, thus forming a trough or groove in the paper and drawing the paper in from both edges. The next two rollers are again in the upper frame and slightly to the rear of and to each side of the two rollers last mentioned, so that they will press the paper in the opposite direction, giving it another bend, and so on continuously until the entire width of the sheet has been fluted or corrugated. To the rear of these fluting or corrugating rolls each of the frames 90 and 91 is provided with a grooved roller 95, said rollers intermeshing, as indicated, so as to finally form the corrugated sheet and hold it in shape. As many of these fluting devices will be employed as the number of fluted sheets desired for the particular covering, and in Fig. 21 I have shown five of such fluting devices mounted in a suitable upright frame 96. The sheets to be fluted are brought from spools or rollers 97, supported in any suitable stand, such as shown at 98, and are drawn through the devices, and thus progressively given longitudinal corrugations. In order to complete them, however, it is necessary to apply a flat or plain sheet to one side thereof, and this is accomplished by providing suitable spools or rollers 99, supported, preferably, in the frame 96, from which spools the flat strips are drawn over pasting-rolls 100, and thence into contact with the fluted strip between the plain-faced roller 101 and the grooved roller 102, thereby pressing the gummed sheet against the fluted one. The fluted sheets of the desired number are then led to the stitching mechanism 4, being first passed between the guide-rollers 103. The strips of paper may be drawn from their spools and through the fluting mechanism by the feed of the stitching mechanism heretofore described, or, if desired, the grooved rollers 95 or the plain and grooved rollers 101 and 102 may be positively driven to draw the sheets from the spools and through the fluting and pasting mechanism.

The corrugating apparatus just described is not claimed in this application, but is claimed in a divisional application hereof filed February 23, 1904, Serial No. 194,807.

When I desire to form non-conducting coverings, partly of paper strips and partly of loose fibrous material—such as hair, mineral wool, asbestos, and the like—I substitute for the spool-supporting frame 2 suitable apparatus for spreading a layer of the fibrous material and applying covering-strips thereto. Such apparatus is shown in Figs. 24 and 25. The loose fibrous material is put into the hopper of a rotary picker 110, which is positively driven from any suitable source, as by the belt-pulleys 111, and which will deliver such fibrous material in a thin even layer through the spout 112 upon an apron or belt 113, running over a table 114. This apron or belt passes over the guide-rollers 115 at each end of the table and is driven from any suitable source. To compact the fibrous material on belt, I provide a series of hammers 116, mounted on rock-shafts 117, extending transversely over the table and having connected thereto the arms 118, which are actuated from any suitable source—as, for instance, eccentrics 119 on the picker-shaft—which eccentrics are connected by suitable connecting-rods 120 to the arms 118 on the rock-shafts. Alternate ones of these rock-shafts are preferably connected to separate eccentrics, as shown in Fig. 25, wherein an eccentric is provided on each end of the picker-shaft, said eccentrics being preferably reversely placed, so that when one half of these hammers are raised the other half will be depressed, as shown in Fig. 24. These hammers alternately rise and fall and stamp or press the fibrous material upon the belt 113 to compact the same. At the end of the table 114 is another table 121, at the forward end of which are the guide-rollers 122. The strips of paper, canvas, or other enveloping material are carried on spools or rollers 123, suitably supported one above and the other below the table 121. From these spools the layers of enveloping material are led over the guide-rollers 122, one on top of and the other below the layer of fibrous material being fed forward by the apron or belt 113, and the combined fibrous material and top and bottom enveloping strips are then led to the stitching mechanism 4, which, as shown, is adapted to unite the enveloping strips at the edges to inclose the fibrous filling and preferably also stitch the same along the center. From this stitching mechanism the filled covering passes through a pair of plain-faced rollers 127, which compact the same, these rollers being adjustable, as by the screws 128. From these rollers the combined layers pass to the forming mechanism heretofore described.

The operation of the apparatus will be readily gathered from the foregoing description. Suffice it to say that the strips of paper or other fibrous material are drawn from the rollers 1 and laid one upon the other and then suitably secured together by the stitching mechanism 4 and fed therethrough in a practically continuous course by the feed-rollers 5 6. Thence they pass to the table 13 and when desired are moistened by the spray-pipes 23 or other convenient means and are then bent into tubular form, as by the bell 25, through which they are drawn in an intermittent manner by the tongs 47, the space between the stitching mechanism and the table 13 permitting the continuous feed through the stitching mechanism and the intermediate drawing through the bell. After leaving the bell the tubular covering passes through the tube 31, as shown, and the bands or rings 32 by the mechanism described are fed off the rear end of the tube 31 upon the tubular covering at suitable intervals, say every foot. Said bands or rings hold the covering in shape until dry and set and may also be used as permanent fastenings. The tube is then cut into sections by the saw 73 and rolled away to any desired point, where they are dried, which completes the process.

It will be observed that the apparatus forms a tubular covering in a progressive manner and is continuous for the entire length of the strips and does not necessitate the stopping and removing of the covering section by section, as in the old process, so that the output is very greatly increased. At the same time the covering is formed with a single longitudinal joint, so that the resiliency of the material can be availed of to hold the covering on the pipe, and especially is this true when the material has been dampened and then is afterward allowed to dry to give a permanent set thereto. The longitudinal joint, furthermore, will be usually out of line, due either to the feathering of the edges of strips of the same width when coiled into a tube or by using strips of varying widths or by laying the strips out of line, as shown, to form the tongue and groove or other equivalent interlocking edges.

While I have described the invention for making tubular non-heat-conducting coverings, I wish it understood that the invention can be applied in part for making these coverings of other form than tubular. I further wish it understood that the apparatus can be used for the manufacture of tubular articles other than non-heat-conducting coverings and even for paper tubes generally, this being especially true where the double convolute bell shown in Figs. 16 to 19 is used, whereby the strips of paper can be coiled into a double convolute tube, and if a suitable adhesive material is applied to the strips a tube without joint will be formed.

What I claim as my invention, and desire to secure by Letters Patent, is—

1. In apparatus for forming non-heat-conducting coverings of paper or other fibrous material, the combination with means for laying three or more strips or layers of the fibrous material one upon the other, of stitching mechanism arranged to unite the same along their longitudinal centers, means for bending the same to the desired form, and mechanism for feeding the same longitudinally through the forming means and thereby progressively bending the same to shape.

2. In apparatus for forming non-heat-conducting coverings of paper or other fibrous material, the combination with means for laying three or more strips or layers of the fibrous material one upon the other, of stitching mechanism for securing the same together, means for bending the same into the desired form, and mechanism for feeding the same longitudinally through the forming means and thereby progressively bending the same into shape.

3. In apparatus for forming tubular non-heat-conducting coverings of paper or other fibrous material, the combination with means for laying strips or layers of the fibrous material one upon the other, of stitching mechanism for securing the same together, a forming bell or funnel, and mechanism for feeding the combined layers through said bell or funnel and thereby progressively bending the same into tubular form.

4. In apparatus for forming non-heat-conducting coverings of paper or other fibrous material, the combination with means for laying three or more strips or layers of the fibrous material one upon the other, of stitching mechanism for uniting said layers, means for bending the same to form mechanism for feeding the same longitudinally through the forming means and thereby progressively bending the same to shape, and means for cutting the same into sections.

5. In apparatus for forming tubular non-heat-conducting coverings of paper or other fibrous material, the combination with means for laying three or more strips or layers of the fibrous material one upon the other, of stitching mechanism for uniting the same, a forming bell or funnel, mechanism for feeding the strips longitudinally through said bell or funnel and thereby progressively bending the same into tubular form, and means for cutting the same into sections.

6. In apparatus for forming tubular non-heat-conducting coverings of paper or other fibrous material, the combination with means for laying strips or layers of the fibrous material one upon the other, of stitching mechanism for uniting said layers, means for bending the same into the desired form, mechanism for intermittently feeding the same through said forming means and thereby progressively bending the same into tubular form, and means for cutting the same into sections.

7. In apparatus for forming tubular articles of paper or other fibrous material, the combination with means for laying strips of the fibrous material one upon the other, of means for bending the same into tubular form, mechanism for feeding the same longitudinally through the bending means and thereby progressively bending the same into tubular form, and mechanism for applying bands at intervals thereto.

8. In apparatus for forming tubular articles of paper or other fibrous material, the combination with means for laying strips of the fibrous material one upon the other, of means for moistening the same, mechanism for progressively bending the same into tubular form, and mechanism for applying bands at intervals thereto.

9. In apparatus for forming tubular articles of paper or other fibrous material, the combination with means for laying strips of the fibrous material one upon the other, of means for moistening one or more of said strips, mechanism for progressively bending the same into tubular form, and mechanism for applying bands at intervals thereto.

10. In apparatus for forming articles of paper or other fibrous material, the combination with means for laying strips or layers of the fibrous material one upon the other, of spray-pipes projecting between said strips for moistening the same, means for progressively bending the moistened strips to form, and means for holding them in this form until dry.

11. In apparatus for forming tubular articles of paper or other fibrous material, the combination with means for laying strips or layers of the fibrous material one upon the other, of stitching mechanism for uniting said strips, feeding-rollers for moving said strips longitudinally, and means for progressively bending the same into tubular form.

12. In apparatus for forming tubular articles of paper or other fibrous material, the combination with means for laying strips or layers of the fibrous material one upon the other, of stitching mechanism for uniting said strips, feeding-rollers for moving said strips longitudinally through said stitching mechanism, a bell for bending the strips into tubular form, and means for intermittently drawing said strips through said bell and thereby progressively bending the same into tubular form.

13. In apparatus for forming articles of paper or other fibrous material, the combination with means for laying strips or layers of the fibrous material one upon the other, of stitching mechanism for uniting said strips, feeding-rollers for moving said strips through the stitching mechanism, and intermittently-operated mechanism for progressively bending the united strips into form, the arrangement being such as to accommodate the overfeed from the stitching mechanism.

14. In apparatus for forming tubular articles of paper or other fibrous material, the combination with means for laying strips of the fibrous material one upon the other, of means for progressively bending the same into tubular form, mechanism for applying bands thereto, and mechanism for cutting the same into sections.

15. In apparatus for forming tubular articles of paper or other fibrous material, the combination with means for laying strips or layers of the fibrous material one upon the other, of stitching mechanism for uniting the same, a forming bell or funnel, mechanism for drawing the strips longitudinally through said bell and thereby progressively bending the same into tubular form, and mechanism for cutting the same into sections.

16. In apparatus for forming tubular articles of paper or other fibrous material, the combination with means for laying strips or layers of the fibrous material one upon the other, stitching mechanism for uniting the same, means for moistening one or more of said strips, a forming bell or funnel, mechanism for drawing the same longitudinally through said bell and thereby bending the same into tubular form, and mechanism for applying bands at intervals thereto.

17. In apparatus for forming tubular articles of paper or other fibrous material, the combination with means for laying strips or layers of said material one upon the other, of stitching mechanism for uniting said strips, a bell or funnel for bending the same into tubular form, means for intermittently drawing the same longitudinally through said bell, and mechanism for cutting the same into sections.

18. In apparatus for forming non-heat-conducting coverings of paper or other fibrous material, the combination with means for laying strips or layers of the material one upon the other, of means for uniting the same, means for bending the same to form, the arrangement being such as to accommodate the overfeed from the uniting means, intermittently-operated gripping mechanism for grasping the same and feeding it longitudinally through the forming mechanism and thereby progressively forming the same to shape, and mechanism for cutting the same into sections.

19. In apparatus for forming tubular non-heat-conducting coverings of paper or other fibrous material, the combination with means for laying strips or layers of the fibrous material one upon the other, of means for uniting the same, a bell or funnel for bending the same into tubular form, the arrangement being such as to accommodate the overfeed from the uniting mechanism, gripping mechanism for intermittently grasping the same and drawing the same longitudinally through the bell and thereby bending it into tubular form, and mechanism for cutting the same into sections.

20. In apparatus for forming tubular articles of paper or other fibrous material, the combination with means for laying strips or layers of the fibrous material one upon the other, of means for uniting the same, a bell or funnel for bending the same into tubular form, mechanism for applying bands at intervals thereto, and intermittently-operated gripping mechanism for grasping the tube and drawing the same through the bell.

21. In apparatus for forming tubular articles of paper or other fibrous material, the combination with means for laying strips or layers of the fibrous material one upon the other, of means for uniting the same, a bell or funnel for bending the same into tubular form, mechanism for applying bands at intervals thereto, intermittently-operating gripping mechanism for grasping the tube and drawing the same through said bell, and means for cutting the tube into sections.

22. In apparatus for forming tubular articles of paper or other fibrous material, the combination with means for laying strips of the fibrous material one upon the other, of means for uniting the same, means for moistening one or more of said strips, a bell or funnel for bending the same into tubular form, mechanism for applying bands or rings at intervals thereto, intermittently-operated gripping mechanism for grasping the tube and drawing the same through the bell, and means for cutting the tube into sections.

23. In apparatus for forming articles of paper or other fibrous material, the combination with means for laying strips or layers of the fibrous material one upon the other, of stitching mechanism for uniting said layers, means for bending the same to form, tongs for intermittently grasping the same and drawing the same through the forming means, and mechanism for moving the tongs back and forth and alternately opening and closing the same to grasp and release the article.

24. In apparatus for forming tubular articles of paper or other fibrous material, the combination with means for laying strips or layers of the fibrous material one upon the other, of stitching mechanism for uniting said layers, a bell or funnel for bending the same into tubular form, tongs for grasping said tubular article and drawing the same through the bell, and mechanism for moving the tongs back and forth and alternately opening and closing the same to grasp and release the tubular article.

25. In apparatus for forming articles of paper or other fibrous material, the combination with means for bending a strip or strips of the fibrous material to form, tongs for engaging and drawing the same through the forming mechanism, a sprocket-chain, and a block or frame thereon engaging the tong-levers, whereby when said block is carried around by the sprocket-chain it will alternately open and close the tongs.

26. In apparatus for forming articles of paper or other fibrous material, the combination with means for laying strips or layers of the fibrous material one upon the other, of means for bending the same to form, tongs for drawing the same through said forming means, a movable saw for severing the same into sections, mechanism for moving the tongs back and forth and alternately opening and closing the same to grasp and release the article, and connections between said saw and tongs-moving mechanism.

27. In apparatus for forming tubular articles of paper or other fibrous material, the combination with means for laying strips or layers of the fibrous material one upon the other, of a bell or funnel for bending the same into tubular form, tongs for drawing the same through said bell, a movable saw for severing the tubular article, mechanism for moving the tongs back and forth and alternately opening and closing the same to grasp and release the tubular article, and connections between the saw and tongs-moving mechanism.

28. In apparatus for forming articles of paper or other fibrous material, the combination with means for progressively bending a strip or strips or layers of the fibrous material into shape, intermittently-acting mechanism for drawing the same through the forming means, a movable saw for cutting the same into sections, and connections between said saw and the intermittently-operating drawing mechanism.

29. In apparatus for forming tubular articles of paper or other fibrous material, the combination with a bell or funnel for bending strips of the fibrous material into tubular form, of tongs for intermittently drawing the same through said bell, a movable saw for cutting the same into sections, sprocket-chains, a frame or block on said chains and engaging the tong-levers for alternately opening and closing the same and moving the same back and forth, and connections between said sprocket-chains and the saw-frame.

30. In apparatus for forming tubular articles of paper or other fibrous material, the combination with a bell or funnel for bending strips of the fibrous material into tubular form, of tongs for intermittently drawing the same through said bell, a movable saw for cutting the same into sections, sprocket-chains for moving said tongs back and forth and alternately opening and closing the same, a pivoted lever, connections between the same and the sprocket-chains, and a rope or the like connecting said lever to the saw for moving the same across the path of the tubular article.

31. In apparatus for forming tubular articles of paper or other fibrous material, the combination with means for progressively bending strips of the fibrous material into tubular form, of a tube through which the same is drawn, bands or rings on said tube, and mechanism for intermittently pushing said bands or rings off the tube and onto the tubular article.

32. In apparatus for forming tubular articles of paper or other fibrous material, the combination with means for bending strips of the fibrous material into tubular form, of a tube through which the same is drawn, bands or rings on said tube, a driven screw and a frame or bracket engaged by said screw and engaging the bands or rings for pushing the same off the tube and onto the tubular article.

33. In apparatus for forming tubular articles of paper or other fibrous material, the combination with a bell for bending strips of the fibrous material into tubular form, of intermittently-actuated mechanism for grasping the tube and drawing the same through said bell, and a traveling mandrel in said tube and in position to be grasped by the feeding mechanism.

34. In apparatus for forming tubular articles of paper or other fibrous material, the combination with a bell, of tongs for grasping the tube and drawing the same through the bell, mechanism for moving said tongs back and forth, a traveling mandrel in the tube in position to be grasped by the tongs, and connections between the mandrel and the tongs-operating mechanism.

35. In apparatus for forming tubular articles of paper or other fibrous material, the combination with means for progressively bending strips of the fibrous material into tubular form, inclined supports, means for progressively feeding the same forward onto said supports, and a saw for severing the same into sections when supported on said table, whereby the sections will roll away.

36. In apparatus for forming tubular articles of paper or other fibrous material, the combination with means for laying strips of the fibrous material one upon the other, of means for progressively bending the same into tubular form, and guides in advance of said bending means arranged to engage the edges of the strips and guide the same, one or both of said guides being provided with grooves to allow a wider strip to pass.

37. In apparatus for forming articles of paper or other fibrous material, the combination with suitable supports for strips of the fibrous material, of mechanism for longitudinally corrugating or fluting one or more thereof, means for uniting said strips, and means for progressively bending the same into form.

38. In apparatus for forming tubular non-heat-conducting coverings of paper or other fibrous material, the combination with means for laying strips or layers of the fibrous material one upon the other, stitching mechanism for uniting said strips, means for pasting a canvas or other sheathing-strip to said united strips, means for bending the combined strips into tubular form, and mechanism for drawing the same longitudinally through said forming means and thereby progressively bending the same into tubular form.

In testimony whereof I, the said JOHN A. McCONNELL, have hereunto set my hand.

JOHN A. McCONNELL.

Witnesses:
 ROBERT C. TOTTEN,
 F. W. WINTER.